United States Patent
Porzio et al.

(10) Patent No.: US 12,411,763 B2
(45) Date of Patent: Sep. 9, 2025

(54) DATA DEFRAGMENTATION CONTROL

(71) Applicant: Micron Technology, Inc., Boise, ID (US)

(72) Inventors: Luca Porzio, Casalnuovo (IT); Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 182 days.

(21) Appl. No.: 18/197,469

(22) Filed: May 15, 2023

(65) Prior Publication Data

US 2023/0367710 A1 Nov. 16, 2023

Related U.S. Application Data

(60) Provisional application No. 63/342,431, filed on May 16, 2022.

(51) Int. Cl.
*G06F 12/06* (2006.01)

(52) U.S. Cl.
CPC ................. *G06F 12/0607* (2013.01)

(58) Field of Classification Search
CPC .. G06F 12/06; G06F 12/0607; G06F 12/0615; G06F 12/0638
See application file for complete search history.

(56) References Cited

U.S. PATENT DOCUMENTS

| | | | | |
|---|---|---|---|---|
| 8,904,137 B1 * | 12/2014 | Zhang | ..................... | G06F 3/067 |
| | | | | 711/165 |
| 2015/0347296 A1 * | 12/2015 | Kotte | ..................... | G06F 3/0679 |
| | | | | 711/103 |
| 2018/0217926 A1 * | 8/2018 | Ogawa | .................. | G06F 3/0679 |
| 2022/0197562 A1 * | 6/2022 | Wada | ....................... | G06F 12/10 |
| 2023/0195617 A1 * | 6/2023 | Cheng | ................. | G06F 12/0246 |
| | | | | 711/154 |
| 2023/0236966 A1 * | 7/2023 | Yarimi | .................. | G06F 3/0638 |
| | | | | 711/170 |

FOREIGN PATENT DOCUMENTS

| WO | WO-2014049678 A1 * | 4/2014 | ......... G06F 12/0246 |
|---|---|---|---|
| WO | WO-2017023458 A1 * | 2/2017 | ............. H04L 47/34 |

* cited by examiner

*Primary Examiner* — Pierre Michel Bataille
(74) *Attorney, Agent, or Firm* — Holland & Hart LLP

(57) ABSTRACT

Methods, systems, and devices for data defragmentation control are described. A memory system may include one or more regions of logical addresses and a plurality of memory cells arranged according to a plurality of physical addresses. In some instances, data may be stored to one or more discontinuous physical addresses and it may be desirable rearrange the data to be within continuous physical addresses (e.g., it may be desirable to defragment the data). Accordingly, the data stored to the one or more discontinuous physical addresses may be arranged (e.g., rearranged) to be within continuous physical addresses based at least in part on a value stored to one or more registers of the memory system.

22 Claims, 6 Drawing Sheets

DATA DEFRAGMENTATION CONTROL

CROSS REFERENCE

The present application for patent claims priority to U.S. Patent Application No. 63/342,431 by Porzio et al., entitled "DATA DEFRAGMENTATION CONTROL," filed May 16, 2022, which is assigned to the assignee hereof, and which is expressly incorporated by reference herein.

FIELD OF TECHNOLOGY

The following relates to one or more systems for memory, including data defragmentation control.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Some memory systems use logical-to-physical (L2P) tables to map logical block addresses (LBAs) with physical addresses. The LBAs may be used by the host system to address stored data at a memory system, and the physical address may be used by the memory system to identify the corresponding physical location for the stored data. In some cases, data may be associated with a continuous LBA that is associated with discontinuous corresponding physical addresses of the memory system. For example, the memory may support a first granularity for writes to addresses that have been erased, but a second granularity (e.g., a block of physical addresses) for erase operations. Because data is constantly written and overwritten to logical addresses of the memory device-resulting in the overwritten data being written to a new physical address-data may ultimately become spread out over several physical addresses (e.g., data may become fragmented).

Memory devices may be configured to rearrange the discontinuous data by reading it from the discontinuous physical addresses and writing it to one or more continuous physical addresses (e.g., the memory system may defragment the data) to improve the overall performance of the associated device. However, because defragmentation mainly affects the associated device's performance, it may be undesirable to perform defragmentation on some devices. For example, it may be less desirable to perform defragmentation on a memory device reaching its end of life (EOL) or a memory device included in a mobile system that is low on battery to preserve endurance or power. Accordingly, a memory system configured to provide control over when a defragmentation operation occurs, based on one or more characteristics of the system, may be desirable.

A memory system configured to provide control over when a defragmentation operation occurs is described herein. In some examples, the memory system may include one or more registers (e.g., mode registers, status registers, or other types of registers) for managing defragmentation operations. The memory device may include a first register configured to store one or more values that indicate whether or not to initiate a defragmentation operation (or whether a defragmentation operation is ongoing). The memory device may also include a second register configured to store one or more values indicating whether to perform a defragmentation operation based on the endurance (or another characteristic) of the memory system, and a third register configured to store one or more values indicating the amount of defragmentation to conduct (e.g., if a defragmentation operation is performed). Utilizing the registers described herein to perform (or to refrain from performing) a defragmentation operation may prolong the life or power of the associated memory system, among other benefits, which may be desirable.

Figure 1:
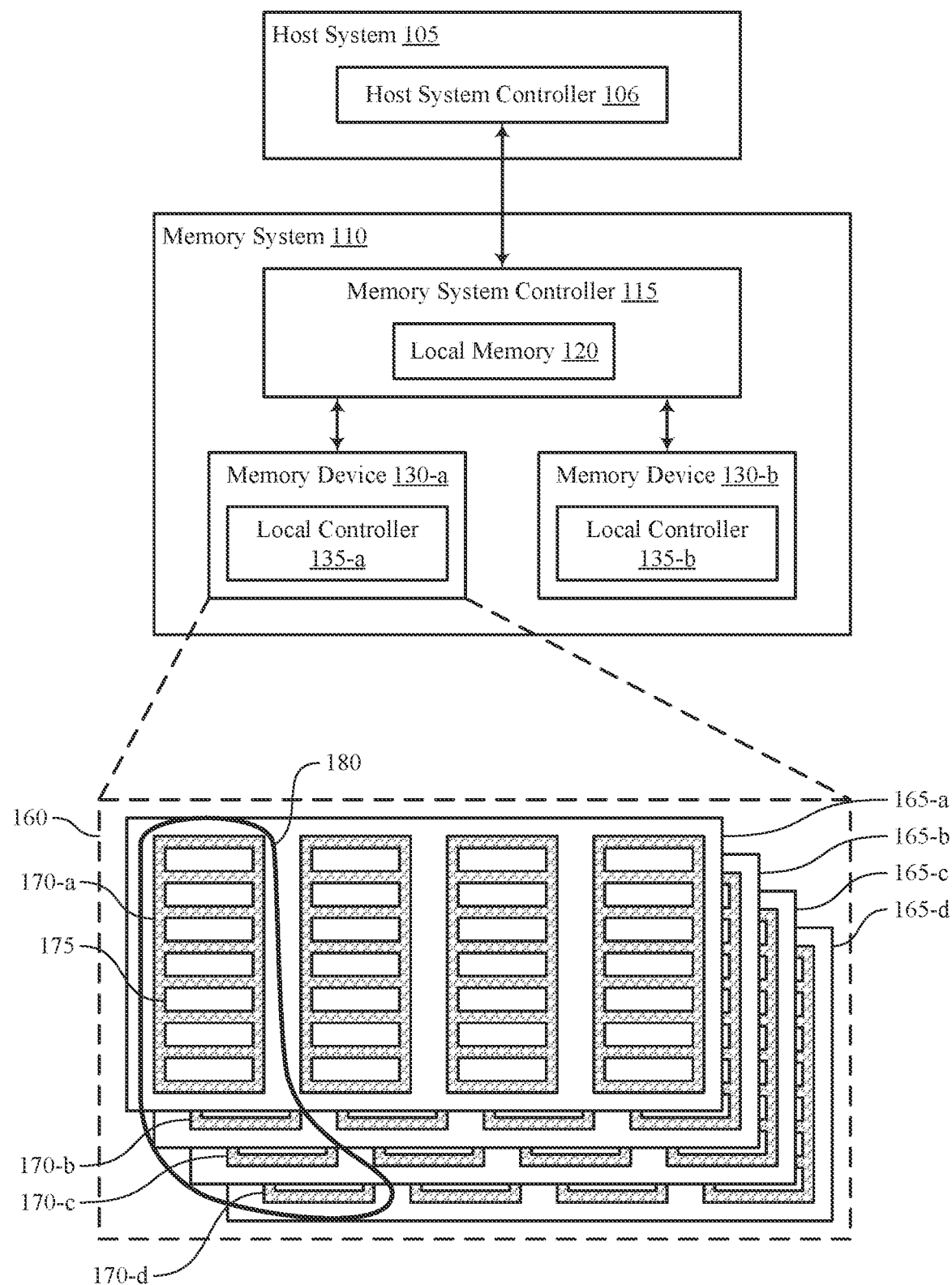
FIG. 1 illustrates an example of a system that supports data defragmentation control in accordance with examples as disclosed herein.
Figure 2:
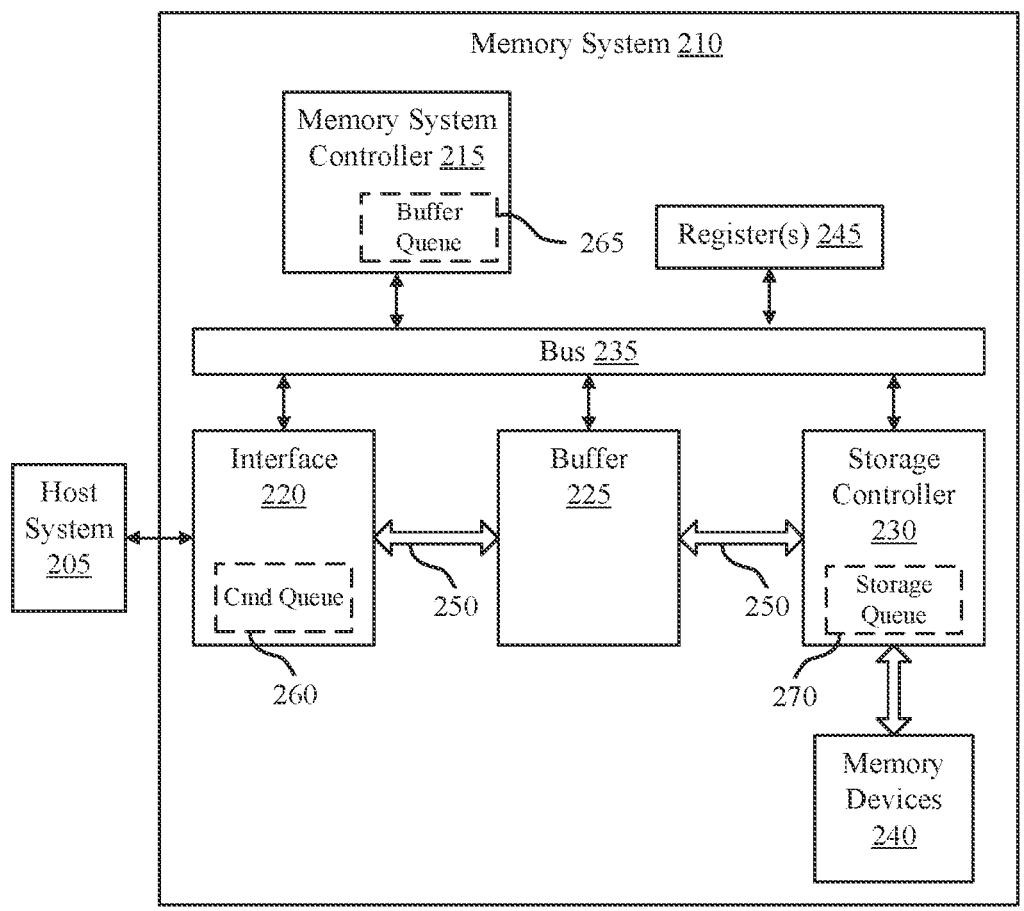
FIG. 2 illustrates an example of a system that supports data defragmentation control in accordance with examples as disclosed herein.

Features of the disclosure are initially described in the context of systems, devices, and circuits with reference to FIGS. 1 and 2. Features of the disclosure are described in the context of a block diagram and a process flow diagram with reference to FIGS. 3 and 4. These and other features of the disclosure are further illustrated by and described in the context of an apparatus diagram and flowchart that relate to data defragmentation control with reference to FIGS. 5 and 6.

FIG. 1 illustrates an example of a system 100 that supports data defragmentation control in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support data defragmentation control. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

As described herein, the memory device 130-a may include one or more logical regions (e.g., regions associated with LBAs) and a plurality of memory cells arranged according to a plurality of physical addresses. In some instances, data associated with a single command or operation (e.g., data associated with a continuous LBA) may be stored to one or more discontinuous physical addresses. Accordingly, the host system 105 may initiate a defragmentation operation to rearrange the data to be within a continuous physical address. The host system 105 may initiate the defragmentation operation based on a value stored to one or more registers (not shown) of the memory system 110 that are managed and/or maintained by the memory system controller 115.

For example, the memory system 110 may include a first register (not shown), a second register (not shown), and a third register (not shown). The registers may be mode registers (or status registers or other types of registers) that are accessible by the memory system controller 115 (e.g., the registers may be write-only registers, read-only registers, or read/write registers). In some examples, the first register may store a value indicating whether a defragmentation operation is to be performed (or whether a defragmentation operation is ongoing). The second register may store a value indicating whether to perform a defragmentation operation based on the endurance (or another characteristic) of the memory device 130-a, and a third register may be configured to store one or more values indicating the amount of defragmentation to conduct (e.g., a size or quantity of data to rearrange into continuous physical addresses, if a defragmentation operation is to occur).

The memory system controller 115 may write the values to the respective registers (or update the values stored to the respective registers) based on one or more characteristics of the memory system 110. For example, the memory system controller 115 may write a value to the third register based on one or more heuristics, such as a quantity (or a size) of frequently-accessed LBAs of the memory device 130-a. In other examples, the memory system controller 115 may write a value to one or more registers based on a command received from the host system 105. Moreover, the memory system controller 115 may read one or more values from the registers and may transmit the values to the host system 105, which may use the values to determine whether to initiate a defragmentation operation. By utilizing the registers described herein to perform (or to refrain from performing) a defragmentation operation, the life or power of the memory system 110 may be prolonged, among other benefits.

FIG. 2 illustrates an example of a system 200 that supports data defragmentation control in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240. e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215. e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

As described herein, the memory devices 240 may include one or more logical regions (e.g., regions associated with LBAs) and a plurality of memory cells arranged according to a plurality of physical addresses. In some instances, data associated with a single command or a set of commands (e.g., data associated with one or more continuous LBAs) may be stored to one or more discontinuous physical addresses. Accordingly, the host system 205 may initiate a defragmentation operation to rearrange the data to be within a continuous physical address. The host system 205 may initiate the defragmentation operation based on a value stored to one or more registers (not shown) of the memory system 210 that are managed by the memory system controller 215.

For example, the memory system 210 may include register(s) 245 that may include a first register, a second register, and a third register. The register(s) 245 may be mode registers (or status registers or other types of registers) that are accessible by the memory system controller 215 (e.g., the registers may be read-only registers, write-only registers, or read/write registers) via the bus 235. In some examples, the first register may store a value indicating whether a defragmentation operation is to be performed (or whether a defragmentation operation is ongoing). The second register may store a value indicating whether to perform a defragmentation operation based on the endurance (or another characteristic) of the memory devices 240, and a third register may be configured to store one or more values indicating the amount of defragmentation to conduct (e.g., a size or quantity of data to rearrange into continuous physical addresses, if a defragmentation operation is to occur).

The memory system controller 215 may write the values to the respective register(s) 245 (or update the values stored to the respective register(s) 245) based on one or more characteristics of the memory system 210. For example, the memory system controller 215 may write a value to the third register based on one or more heuristics, such as a quantity (or a size) of frequently-accessed LBAs of the memory devices 240. In other examples, the memory system controller 215 may write a value to one or more registers based on a command received from the host system 205. Moreover, the memory system controller 215 may read one or more values from the registers and may transmit the values to the host system 205, which may use the values to determine whether to initiate a defragmentation operation. By utilizing the registers described herein to perform (or to refrain from performing) a defragmentation operation, the life or power of the memory system 210 may be prolonged, among other benefits.

Figure 3:
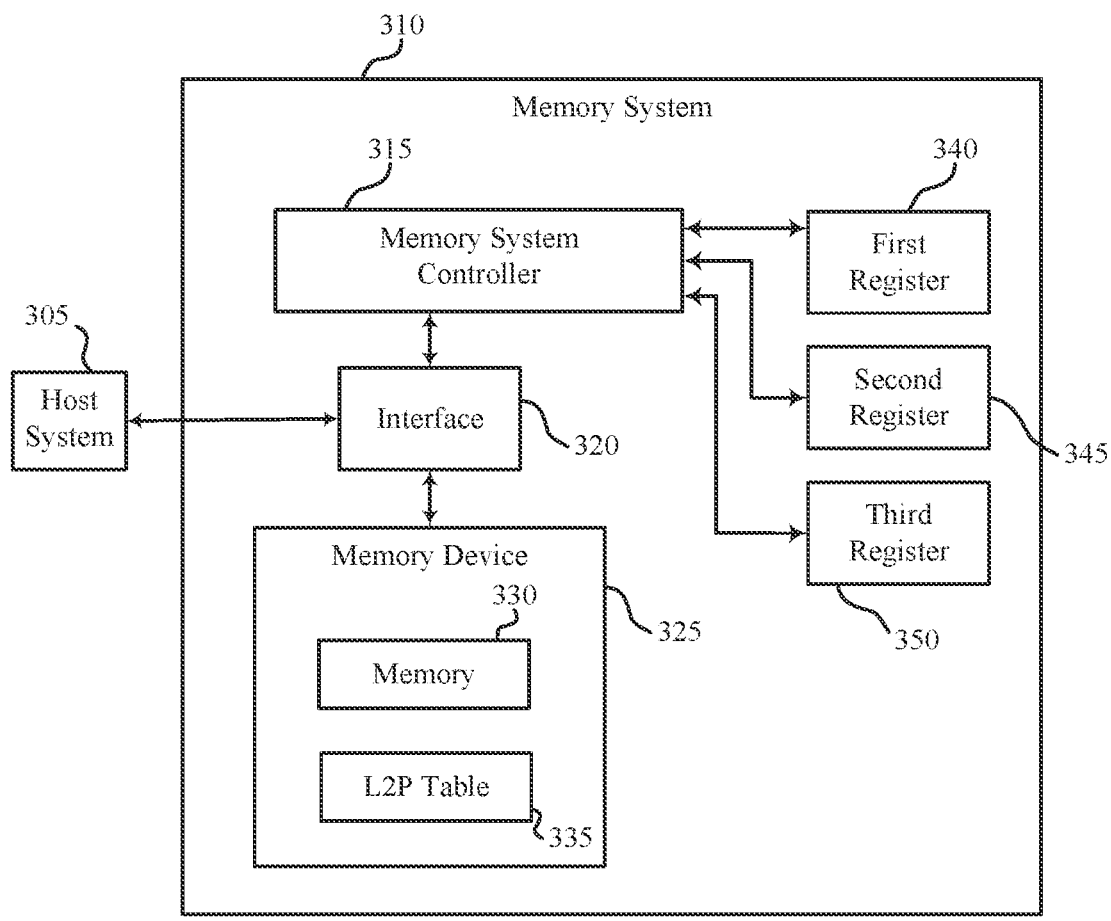
FIG. 3 illustrates an example of a block diagram that supports data defragmentation control in accordance with examples as disclosed herein.

FIG. 3 illustrates an example of a block diagram 300 that supports data defragmentation control in accordance with examples as disclosed herein. The block diagram 300 may include a host system 305 and a memory system 310. The memory system 310 may include a memory system controller 315, an interface 320, a memory device 325, a first register 340, a second register 345, and a third register 350. In some examples, the memory device 325 may include a memory 330 and an L2P table 335. The host system 305, the memory system 310, the memory system controller 315, the memory device 325, the first register 340, the second register 345, and the third register 350 may be respective examples of a host system, a memory system, a memory system controller, a memory device, a first register, a second register, and a third register as described with reference to FIGS. 1 and 2. The first register 340, the second register 345, and the third register 350 may each be configured to store one or more values for performing (or not performing) a defragmentation operation on the memory 330 of the memory device 325. By utilizing the registers to perform (or to refrain from performing) a defragmentation operation, the life or power of the memory system 310 may be prolonged, among other benefits. Although illustrated as a single memory device 325, the memory system 310 may include multiple memory devices 325, in some cases.

The memory system 310 may receive commands from the host system 305, via the interface 320, and write data to the memory 330 of the memory device 325. In some cases, the memory system controller 315 may receive the commands from the host system 305 and may determine physical addresses of the memory 330 that correspond to LBAs addressed by the command. The memory system controller 315 may determine the physical addresses of the memory 330 using the L2P table 335 and may subsequently write data to or read data from the physical addresses of the memory 330 to execute the commands.

In some examples, the memory device 325 may support a first granularity for writes to addresses that have been erased, but a second granularity (e.g., a block of physical addresses) for erase operations. Because data is constantly written and overwritten to logical addresses of the memory device 325—resulting in the overwritten data being written to a new physical address of memory 330—data may ultimately become spread out over several physical addresses (e.g., data may become fragmented). Fragmentation of the data may degrade the overall performance of the memory system 310. As described herein, it may be desirable to defragment the data (e.g., rearrange the data to be within continuous physical addresses that correspond to the continuous LBAs) to improve the performance of the memory system 310. However, instances may occur where it may be less desirable to perform a defragmentation operation, thus the first register 340, the second register 345, and the third register 350 may be utilized to perform (or to refrain from performing) a defragmentation operation based on one or more characteristics of the memory system 310.

The first register 340, which may be an example of a mode register or another type of register, may store one or more values that indicate whether a defragmentation operation is to be performed on the memory 330. For example, the first register 340 may store a first value (e.g., a "1") that indicates a defragmentation operation will start during the next duration that the memory system 310 is idle. The first register 340 may also store a second value (e.g., a "0") that indicates a defragmentation operation will not start. That is, a defragmentation operation will not start even if the memory system 310 is idle for a duration. The first register 340 may also store a third value (e.g., a "2") that indicates a defragmentation operation is presently ongoing.

In some instances, the host system 305 may be configured to write the first and second values to the first register 340. For example, if it is desirable to improve the overall performance of the memory system 310, the host system 305 may transmit signaling to the memory system 310 to write the first value to the first register 340. In other examples (e.g., if it is undesirable to perform a defragmentation operation at a particular time), the host system 305 may transmit signaling to the memory system 310 to write the second value to the first register 340. The second value may be a default value of the first register 340—meaning that, as a default—a defragmentation operation will not occur unless the host system 305 transmits signaling for the memory system 310 (e.g., for the memory system controller 315) to write the first value to the first register 340. Additionally or alternatively, the memory system controller 315 may be configured to write the third value to the first register 340 when a defragmentation operation on the memory 330 is initiated.

The second register 345, which may be an example of a mode register or another type of register, may store one or more values associated with an endurance of the memory system 310 (e.g., of the memory device 325 of the memory system). For example, the second register 345 may store a value (e.g., a threshold or a threshold value) indicating a maximum quantity of program/erase (P/E) cycles performed on the memory 330 before defragmentation operations are no longer performed. If the quantity of P/E cycles performed on the memory 330 satisfies (e.g., exceeds, or meets or exceeds) the threshold value stored to the second register then a defragmentation operation may not be performed on the memory 330. In some instances, the default value stored to the second register 345 may be "0" such that a defragmentation operation may not be performed if any P/E cycles have been performed on the memory 330. The default value may be set at "0" so that defragmentation is an optional feature to be performed. However, the value (e.g., the threshold value) stored to the second register 345 may be configurable, thus defragmentation may be performed on the memory 330 of the memory system 310 if desirable.

Additionally or alternatively, the threshold quantity stored by the second register 345 may be set based on an expected lifecycle (e.g., an expected endurance) of the memory 330. Moreover, the memory system controller 315 may track the quantity of P/E cycles performed on the memory 330 using a counter or other component of the memory system 310. Thus, when the host system 305 transmits signaling to the memory system 310 to initiate a defragmentation operation, the memory system controller 315 may compare the quantity of P/E cycles performed on the memory 330 to the threshold before initiating the defragmentation operation. If the quantity of P/E cycles does not satisfy the threshold, then the defragmentation operation may be performed. However, if the quantity of P/E cycles satisfies the threshold, then signaling may be transmitted to the host system 305 and, in some examples, the host system may transmit return signaling to write a second value to the first register 340. Although the second register 345 is described as storing a threshold value associated with a quantity of P/E cycles, the second register may store a threshold value associated with any metric or characteristic of the memory system 310.

The third register 350, which may be an example of a mode register or another type of register, may store one or more values indicating a size or quantity of the memory 330 that needs to be defragmented. For example, the third register 350 may store a value indicating a total quantity of megabits (MBs) of the memory 330 that need to be defragmented. The value stored to the third register 350 may be determined by (and written to the third register 350 by) the memory system controller 315 using one or more algorithms. For example, the memory system controller 315 may determine, using an algorithm, the most-frequently-accessed portions of a logical space of the memory 330. Based on which portions are most-frequently accessed, the memory system controller 315 may determine a size of the memory 330 needing to undergo a defragmentation operation and may store a value indicative of the size to the third register 350. Thus, before initiating a defragmentation operation, the host system 305 may read the value from the third register 350 and may initiate a defragmentation operation on a subset of the memory 330 based on a value stored to the third register 350.

The host system 305 may initiate a defragmentation operation when the memory system 310 is in an idle state when no access operations are performed on the memory device 325. For example, the memory system 310 may perform one or more background operations (e.g., BKOPS) while in an idle state, and may also defragment data during this duration. In some examples, the background operations performed on the memory system 310 may be manual BKOPS or automatic BKOPS, which may be defined by a standard such as a Joint Electron Device Engineering Council (JEDEC) standard. Moreover, the host system 305 may stop the background operations performed on the memory 330 at any time without accessing the first register 340, the second register 345, or the third register 350. However, once a defragmentation operation begins, the host system 305 may only be able to stop the operation by writing the second value (e.g., a "1") to the first register 340.

To perform a defragmentation operation, the memory system controller 315 (or another component of the memory system 310) may read data from discontinuous physical addresses of the memory 330 and may write (e.g., rewrite, rearrange) the data to be within continuous physical addresses. In some instances, the memory system controller 315 may identify one or more blocks of continuous physical addresses of the memory 330 before reading the data from the discontinuous physical addresses. Additionally or alternatively, after rearranging the data to be within the continuous physical addresses, the memory system controller 315 may update one or more mappings stored to the L2P table 335. The updated mappings may reflect the association between LBAs and the physical addresses to which the data was written to. By utilizing the registers to perform (or to refrain from performing) a defragmentation operation, the life or power of the memory system 310 may be prolonged, among other benefits.

Figure 4:
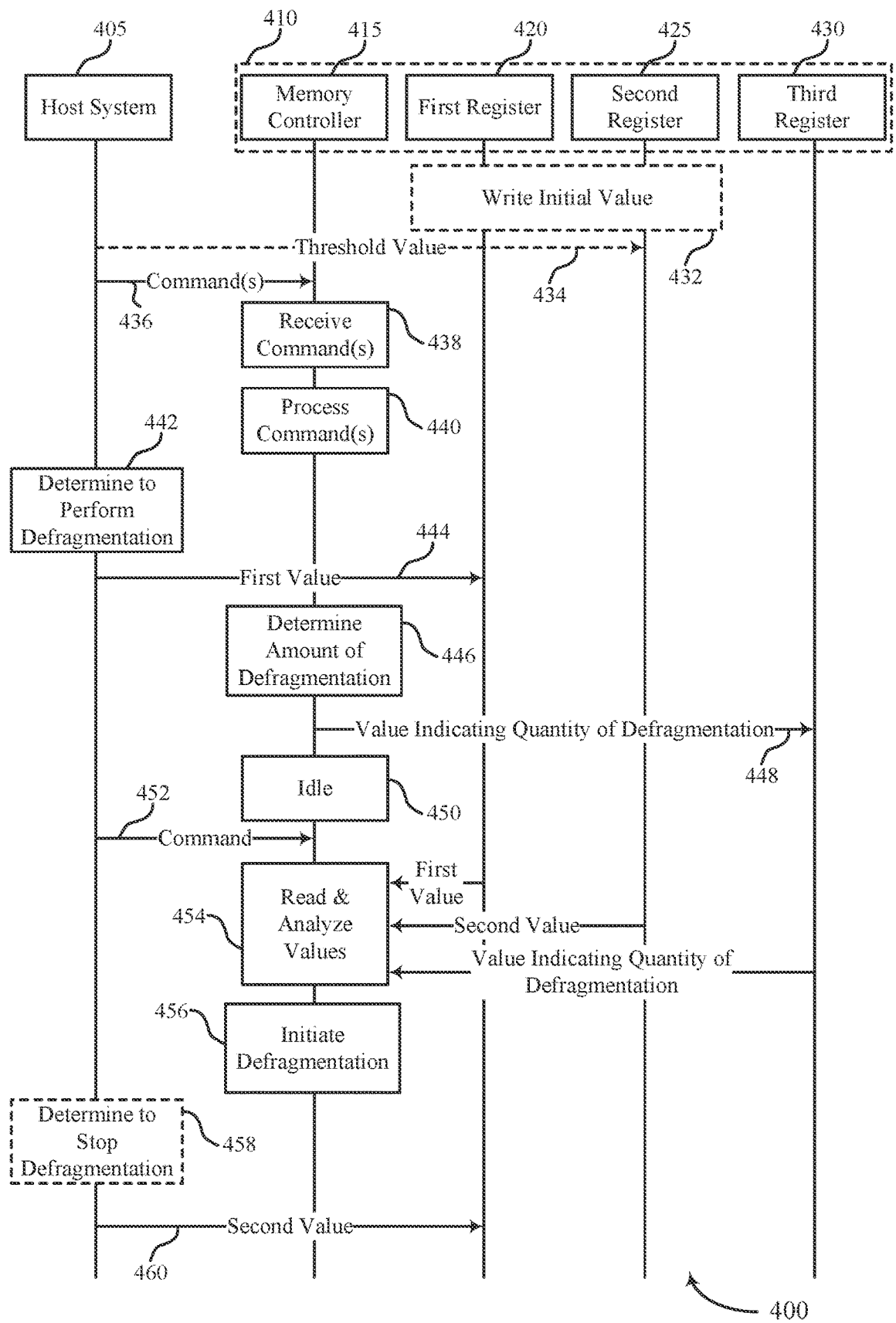
FIG. 4 illustrates an example of a process flow diagram that supports data defragmentation control in accordance with examples as disclosed herein.

FIG. 4 illustrates an example of a process flow diagram 400 that supports data defragmentation control in accordance with examples as disclosed herein. The process flow diagram 400 may include a host system 405 and a memory system 410. The memory system 410 may include a memory controller 415 (e.g., a memory system controller 415), a first register 420, a second register 425, or a third register 430. The host system 405 and the memory system 410 may be respective examples of the host system and the memory system described with reference to FIG. 3, thus the memory system 410 may also include an interface and a memory device that includes a memory and a L2P table, among other components. The first register 420, the second register 425, and the third register 430 may each be configured to store one or more values for performing (or not performing) a defragmentation operation on a memory (e.g., the memory 330 as described with reference to FIG. 3) of a memory device (e.g., a memory device 325 as described with reference to FIG. 3). By utilizing the registers to perform (or to refrain from performing) a defragmentation operation, the life or power of the memory system 410 may be prolonged, among other benefits.

At 432, initial values may be written to the first register 420, the second register 425, or both. In some examples, the initial values may be written to the first register 420 and the second register 425 by the memory controller 415, whereas in other examples the initial values may be programmed during manufacturing of the memory system 410. For example, a second value (e.g., a "0") may be initially written to the first register 420. As described herein, the second value may indicate that no defragmentation operations are to be performed on the memory device associated with the memory system 410 (e.g., until a different value is programmed to the first register 420). Additionally or alternatively, a "0" (or a value indicating that a defragmentation operation may not be performed if any P/E cycles have been performed on the associated memory) may be written to the second register 425. As described herein, a "0" or corresponding value may be the default value such that, if a customer or user of the memory system 410 desires that defragmentation is to be performed on the associated memory, the default value may be overwritten.

At 434, a threshold value may be written to the second register 425. For example, the threshold value may be written to the second register 425 by the host device (e.g., via the memory controller 415). In some examples, the threshold value may be written upon the memory system 410 being installed or booted for a first time. Moreover, the threshold value may be written to the second register 425 due to the second register 425 storing an initial value of "0" (e.g., at 432) or a value that is otherwise undesirable. For example, the threshold value may be set as a quantity of P/E cycles that is less than an anticipated lifetime quantity of P/E cycles for the associated memory. In other words, the threshold may be set based on the expected life of the associated memory.

At 436, a plurality of commands may be transmitted from the host system 405. For example, the commands may include access commands such as write commands, read commands, erase commands, and the like, and may each include a LBA of the memory of the memory system 410. At 438, the commands may be received. For example, the commands may be received by the memory controller 415. At 440, the commands may be processed. For example, the commands may be processed by the memory controller 415 such that the memory controller 415 accesses one or more memory cells having physical addresses associated with the LBAs included in the command(s).

As described herein, multiple commands may be transmitted from the host system 405 to the memory system 410 over a duration. The commands may write and overwrite various LBAs. Because overwriting an LBA containing previous data may result in writing the new data to a different physical address (and corresponding update of the L2P table), data associated with a continuous set of LBAs may be broken up into discontinuous corresponding physical addresses. That is, the data may become fragmented, which may degrade the overall performance of the memory system 410. Thus, it may be desirable to perform one or more defragmentation operations on the memory system 410.

At 442, it may be desirable to perform a defragmentation operation on the memory system 410 (e.g., on a memory of the memory system 410). For example, the host system 405 may determine to perform a defragmentation operation on the memory system 410 based on one or more performance characteristics of the memory system 410. The performance characteristics may include the memory system 410 having a relatively low latency or bandwidth or having a relatively high battery supply (or being connected to a power source) if the memory system 410 is implemented in a mobile device or mobile application.

At 444, a first value may be written to the first register 420 of the memory system 410. For example, the host system 405 may write the first value to the first register 420 (e.g., via the memory controller 415) based on determining to perform a defragmentation operation on the memory system 410. As described herein, the first value may indicate for a defragmentation operation to be performed when the memory system 410 is idle for a duration.

At 446, an amount of defragmentation to be performed on the memory system 410 (e.g., on the memory associated with the memory system 410) may be determined. For example, the memory controller 415 may determine the amount of defragmentation to be performed. The memory controller 415 may determine the amount (e.g., the quantity, the size) of data to defragment based on one or more heuristics, such as a quantity of frequently-accessed LBAs. That is, if a particular LBA or set of LBAs is frequently accessed, then a value representative of an amount of data associated with the LBA or LBAs may be written to the third register 430.

At 448, a value indicating the quantity of defragmentation to be performed on the memory system 410 may be written to the third register 430. For example, the memory controller 415 may write the value (e.g., a third value) to the third register 430 based on determining the amount of defragmentation to be performed on the memory system 410.

At 450, the memory system 410 may be idle for a duration. For example, during the duration, access operations may be performed on the memory associated with the memory system 410. Other operations such as maintenance operations (e.g., BKOPS) or defragmentation operations, however, may be performed during the duration. At 452, one or more commands may be transmitted from the host system 405 to the memory system 410. In some examples, the command(s) may initiate one or more maintenance operations (e.g., BKOPS) to be performed on the memory system.

At 454, values stored to the first register 420, the second register 425, and the third register 430 may be read and analyzed. For example, the memory controller 415 may read and analyze the values stored to each of the registers based on receiving the command (e.g., at 452) and/or based on the memory system 410 being idle for a duration.

For example, the memory controller 415 may read a first value from the first register 420. The first value (e.g., a "1") may indicate that a defragmentation operation is to occur based on the maintenance operations (e.g., the BKOPS) being performed.

The memory controller 415 may read a second value from the second register 425. As described herein, the second value may be a threshold value associated with a quantity of P/E cycles performed on the memory associated with the memory system 410. The memory controller 415 may then compare a quantity of P/E cycles performed on the memory (e.g., which may be tracked by the memory controller 415 using a counter or other component as described herein) to the threshold value. If the quantity of P/E cycles does not satisfy the threshold value, then the defragmentation operation may be performed based on the first register 420 storing the first value. However, if the quantity of P/E cycles satisfies the threshold value, the defragmentation operation may not be performed because the memory system 410 may be undesirably close to EOL. In some instances, if the quantity of P/E cycles satisfies the threshold value, signaling may be transmitted to the host system 405 and the host system 405 may write the second value to the first register 420 based on receiving the signaling. In other examples, the memory controller 415 may write the second value to the first register 420 based on the quantity of P/E cycles satisfying the threshold value.

The memory controller 415 may also read the value indicating the quantity of defragmentation to perform (e.g., the third value) from the third register 430. As described herein, the third value may indicate the quantity of defragmentation to perform. At 456, a defragmentation operation may be initiated. For example, the memory controller 415 may initiate the defragmentation operation based on the values stored to the first register 420 and the second register 425 and the amount of data to be defragmented may be based on the third value stored to the third register 430. The defragmentation operation may be performed during the duration in which the memory system 410 is idle and may be performed either serially or in parallel with the maintenance operations that were initiated based on the command transmitted from the host system 405 (e.g., at 452).

In some instances, before initiating the defragmentation operation (e.g., at 456), the memory controller 415 (or another component of the memory system 410) may identify portions of memory to defragment. For example, the memory controller 415 may perform a scan or other type of operation to identify data that is associated with one or more continuous LBAs but that is stored to one or more associated, discontinuous physical addresses. The memory controller 415 may identify such data using an L2P table (e.g., an L2P table 335 as described with reference to FIG. 3) or other source of mappings between logical space and physical addresses. An identification of the data (e.g., a LBA associated with the discontinuous physical addresses or the actual discontinuous physical addresses) may be stored to a portion of the memory system 410 and the memory controller 415 may access the identification of the data for the defragmentation operation. Such an identification, although not illustrated in FIG. 4, may occur at any time before the defragmentation operation is initiated (e.g., at any time before 456).

At 458, it may be desirable to stop the defragmentation operation. For example, the host system 405 may determine to stop the defragmentation operation based on one or more characteristics of the memory system 410, such as a power supply of associated with the memory system 410 running low. At 460, the second value may be written to the first register 420. For example, the host system 405 may write the second value to the first register 420 (e.g., via the memory controller 415), which may result in the defragmentation operation being stopped. That is, the memory controller 415 may stop the ongoing defragmentation operation (not shown) based on the second value being written to the first register 420. By utilizing the registers to perform (or to refrain from performing) a defragmentation operation, the life or power of the memory system 410 may be prolonged, among other benefits.

Figure 5:
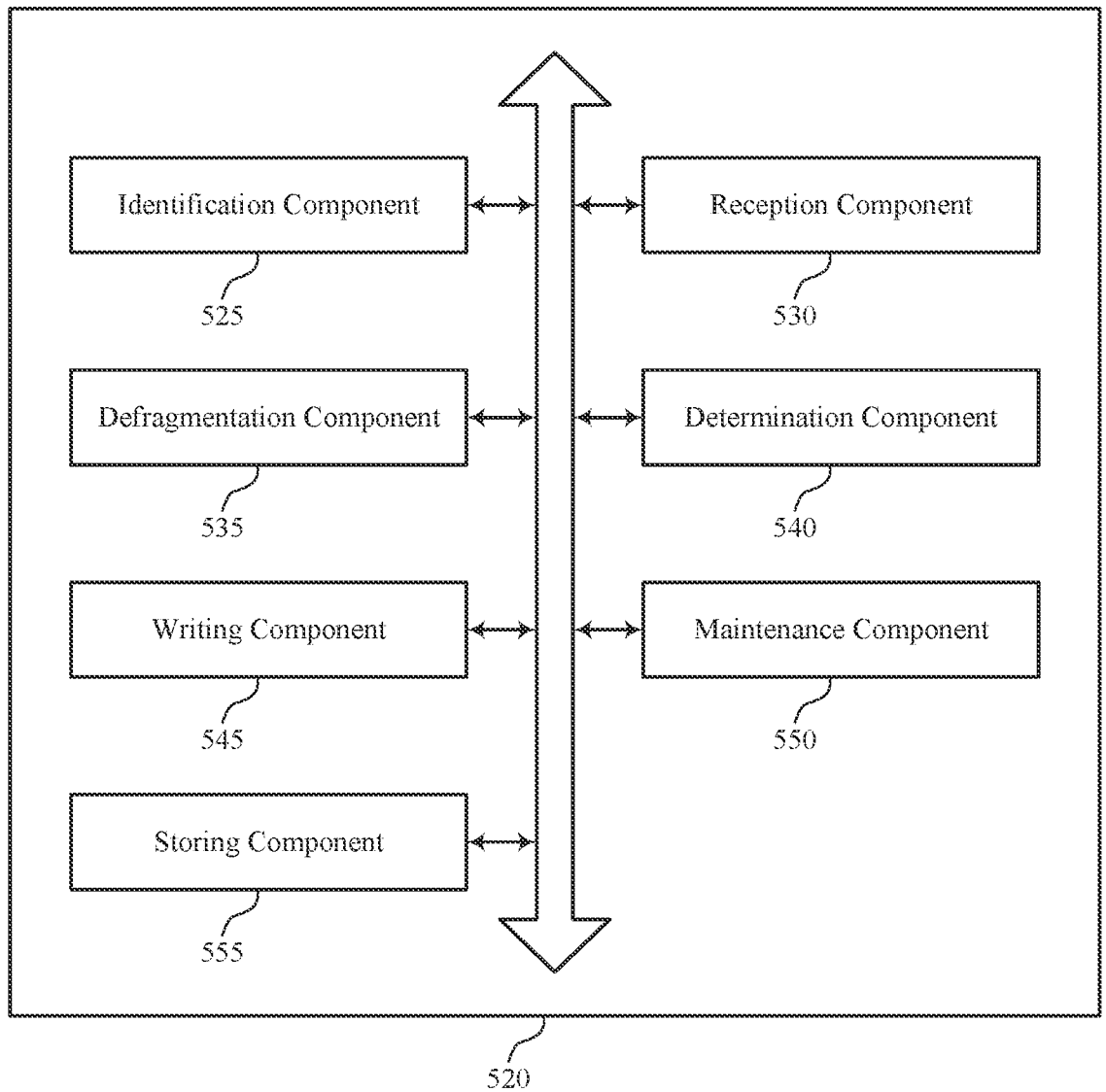
FIG. 5 shows a block diagram of a memory system that supports data defragmentation control in accordance with examples as disclosed herein.

FIG. 5 shows a block diagram 500 of a memory system 520 that supports data defragmentation control in accordance with examples as disclosed herein. The memory system 520 may be an example of aspects of a memory system as described with reference to FIGS. 1 through 4. The memory system 520, or various components thereof, may be an example of means for performing various aspects of data defragmentation control as described herein. For example, the memory system 520 may include an identification component 525, a reception component 530, a defragmentation component 535, a determination component 540, a writing component 545, a maintenance component 550, a storing component 555, or any combination thereof. Each of these components may communicate, directly or indirectly, with one another (e.g., via one or more buses).

The identification component 525 may be configured as or otherwise support a means for identifying, for a memory system including a plurality of regions of logical addresses and a plurality of memory cells arranged according to a plurality of physical addresses, a region of the plurality of regions having one or more continuous logical addresses associated with discontinuous corresponding physical addresses of the plurality of physical addresses. In some examples, the identification component 525 may be configured as or otherwise support a means for identifying, after rearranging the information, a second region of the plurality of regions having one or more logical addresses associated with discontinuous corresponding physical addresses of the plurality of physical addresses.

The reception component 530 may be configured as or otherwise support a means for receiving, at a first register of the memory system, a first value enabling rearranging of information associated with continuous logical addresses that are associated with discontinuous corresponding physical addresses. In some examples, the reception component 530 may be configured as or otherwise support a means for receiving, at a second register of the memory system, a second value. In some examples, the reception component 530 may be configured as or otherwise support a means for receiving, from a host device, a first command for performing the one or more maintenance operations on the memory system.

The defragmentation component 535 may be configured as or otherwise support a means for rearranging, during a duration for performing one or more maintenance operations on the memory system, information stored within the discontinuous corresponding physical addresses to be within continuous physical addresses of the plurality of physical addresses based at least in part on the first value of the first register. In some examples, the defragmentation component 535 may be configured as or otherwise support a means for refraining, during a second duration for performing one or more maintenance operations on the memory system, from defragmenting third information stored within discontinuous corresponding physical addresses from being within continuous physical addresses of the plurality of physical addresses based at least in part on the second value of the first register.

In some examples, to support rearranging the information stored within the discontinuous corresponding physical addresses to be within continuous physical addresses of the plurality of physical addresses, the defragmentation component 535 may be configured as or otherwise support a means for reading data from the discontinuous corresponding physical addresses. In some examples, to support rearranging the information stored within the discontinuous corresponding physical addresses to be within continuous physical addresses of the plurality of physical addresses, the defragmentation component 535 may be configured as or otherwise support a means for writing the data associated with the plurality of physical addresses to the continuous physical addresses of the plurality of physical addresses based at least in part on reading the data, where rearranging the information is based at least in part on reading the data and writing the data.

In some examples, the determination component 540 may be configured as or otherwise support a means for determining that a quantity of access operations performed on the plurality of memory cells of the memory system does not satisfy the second value, where rearranging the information is based at least in part on determining that the quantity of access operations does not satisfy the second value. In some examples, the determination component 540 may be configured as or otherwise support a means for determining that the quantity of access operations performed on the plurality of memory cells of the memory system satisfies the second value, where second information stored within the discontinuous corresponding physical addresses to be within continuous physical addresses of the plurality of physical addresses is not rearranged based at least in part on determining that the quantity of access operations satisfies the second value.

In some examples, the writing component 545 may be configured as or otherwise support a means for writing a third value to a third register of the memory system based at least in part on reading the first value from the first register of the memory system, where a quantity of the information rearranged is based at least in part on the third value read from the third register of the memory system. In some examples, the writing component 545 may be configured as or otherwise support a means for writing a second value to the first register based at least in part on receiving the second value from a host device.

In some examples, the maintenance component 550 may be configured as or otherwise support a means for performing, during the duration, the one or more maintenance operations on the memory system based at least in part on receiving the first command.

In some examples, the storing component 555 may be configured as or otherwise support a means for storing a first physical address of the plurality of physical addresses in a logical-to-physical table of the memory system based at least in part on rearranging the information.

In some examples, the plurality of memory cells are not accessed during the duration.

Figure 6:
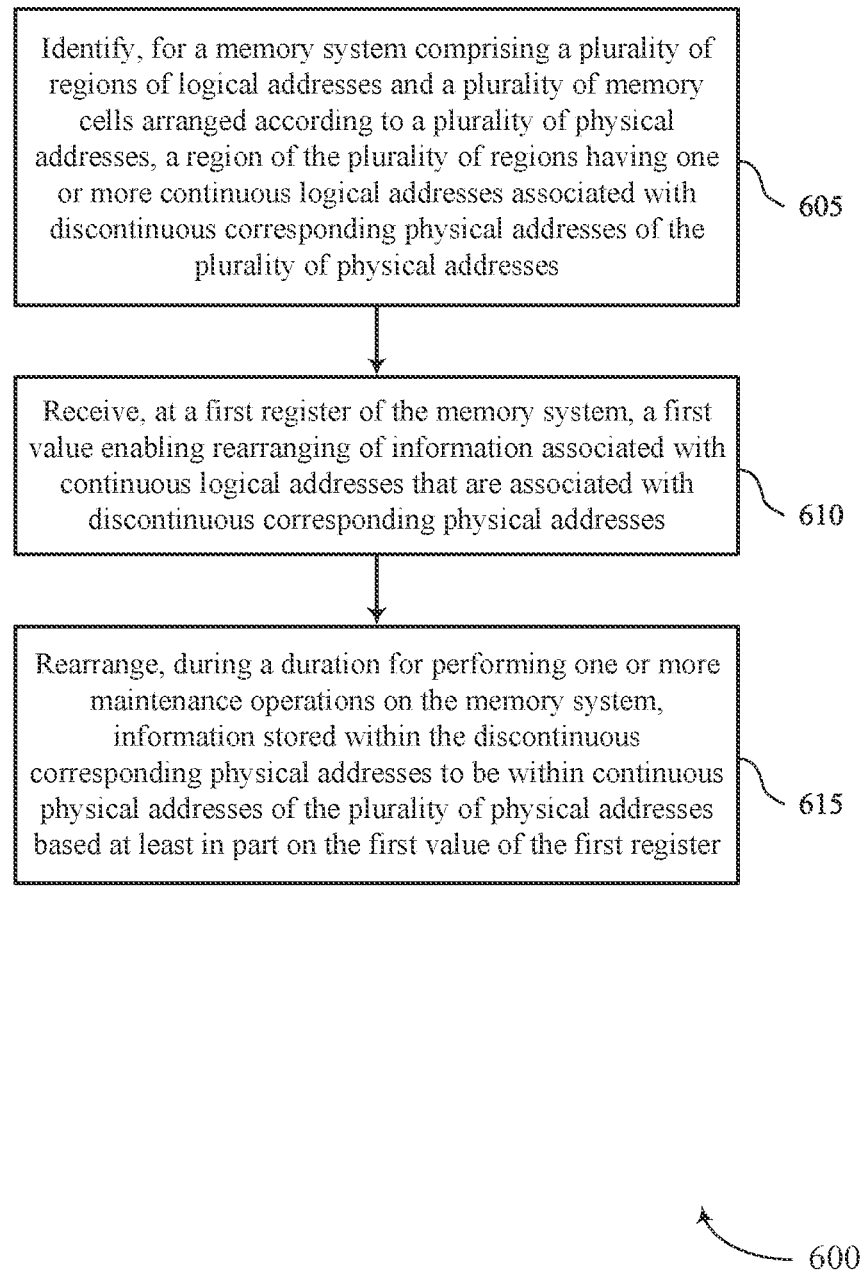
FIG. 6 shows a flowchart illustrating a method or methods that support data defragmentation control in accordance with examples as disclosed herein.

FIG. 6 shows a flowchart illustrating a method 600 that supports data defragmentation control in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include identifying, for a memory system including a plurality of regions of logical addresses and a plurality of memory cells arranged according to a plurality of physical addresses, a region of the plurality of regions having one or more continuous logical addresses associated with discontinuous corresponding physical addresses of the plurality of physical addresses. The operations of 605 may be performed in accordance with examples as disclosed herein. In some examples, aspects of the operations of 605 may be performed by an identification component 525 as described with reference to FIG. 5.

At 610, the method may include receiving, at a first register of the memory system, a first value enabling rearranging of information associated with continuous logical addresses that are associated with discontinuous corresponding physical addresses. The operations of 610 may be performed in accordance with examples as disclosed herein. In some examples, aspects of the operations of 610 may be performed by a reception component 530 as described with reference to FIG. 5.

At 615, the method may include rearranging, during a duration for performing one or more maintenance operations on the memory system, information stored within the discontinuous corresponding physical addresses to be within continuous physical addresses of the plurality of physical addresses based at least in part on the first value of the first register. The operations of 615 may be performed in accordance with examples as disclosed herein. In some examples, aspects of the operations of 615 may be performed by a defragmentation component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for identifying, for a memory system including a plurality of regions of logical addresses and a plurality of memory cells arranged according to a plurality of physical addresses, a region of the plurality of regions having one or more continuous logical addresses associated with discontinuous corresponding physical addresses of the plurality of physical addresses; receiving, at a first register of the memory system, a first value enabling rearranging of information associated with continuous logical addresses that are associated with discontinuous corresponding physical addresses; and rearranging, during a duration for performing one or more maintenance operations on the memory system, information stored within the discontinuous corresponding physical addresses to be within continuous physical addresses of the plurality of physical addresses based at least in part on the first value of the first register.

Aspect 2: The method, apparatus, or non-transitory computer-readable medium of aspect 1, further including operations, features, circuitry, logic, means, or instructions, or any combination thereof for receiving, at a second register of the memory system, a second value and determining that a quantity of access operations performed on the plurality of memory cells of the memory system does not satisfy the second value, where rearranging the information is based at least in part on determining that the quantity of access operations does not satisfy the second value.

Aspect 3: The method, apparatus, or non-transitory computer-readable medium of aspect 2, further including operations, features, circuitry, logic, means, or instructions, or any combination thereof for identifying, after rearranging the information, a second region of the plurality of regions having one or more logical addresses associated with discontinuous corresponding physical addresses of the plurality of physical addresses and determining that the quantity of access operations performed on the plurality of memory cells of the memory system satisfies the second value, where second information stored within the discontinuous corresponding physical addresses to be within continuous physical addresses of the plurality of physical addresses is not rearranged based at least in part on determining that the quantity of access operations satisfies the second value.

Aspect 4: The method, apparatus, or non-transitory computer-readable medium of any of aspects 1 through 3, further including operations, features, circuitry, logic, means, or instructions, or any combination thereof for writing a third value to a third register of the memory system based at least in part on reading the first value from the first register of the memory system, where a quantity of the information rearranged is based at least in part on the third value read from the third register of the memory system.

Aspect 5: The method, apparatus, or non-transitory computer-readable medium of any of aspects 1 through 4, further including operations, features, circuitry, logic, means, or instructions, or any combination thereof for receiving, from a host device, a first command for performing the one or more maintenance operations on the memory system and performing, during the duration, the one or more maintenance operations on the memory system based at least in part on receiving the first command.

Aspect 6: The method, apparatus, or non-transitory computer-readable medium of any of aspects 1 through 5, further including operations, features, circuitry, logic, means, or instructions, or any combination thereof for writing a second value to the first register based at least in part on receiving the second value from a host device and refraining, during a second duration for performing one or more maintenance operations on the memory system, from defragmenting third information stored within discontinuous corresponding physical addresses from being within continuous physical addresses of the plurality of physical addresses based at least in part on the second value of the first register.

Aspect 7: The method, apparatus, or non-transitory computer-readable medium of any of aspects 1 through 6 where rearranging the information stored within the discontinuous corresponding physical addresses to be within continuous physical addresses of the plurality of physical addresses includes operations, features, circuitry, logic, means, or instructions, or any combination thereof for reading data from the discontinuous corresponding physical addresses and writing the data associated with the plurality of physical addresses to the continuous physical addresses of the plurality of physical addresses based at least in part on reading the data, where rearranging the information is based at least in part on reading the data and writing the data.

Aspect 8: The method, apparatus, or non-transitory computer-readable medium of any of aspects 1 through 7, further including operations, features, circuitry, logic, means, or instructions, or any combination thereof for storing a first physical address of the plurality of physical addresses in a logical-to-physical table of the memory system based at least in part on rearranging the information.

Aspect 9: The method, apparatus, or non-transitory computer-readable medium of any of aspects 1 through 8 where the plurality of memory cells are not accessed during the duration.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three-dimensional structure where two dimensions are greater than a third, e.g., a thin-film. Layers or levels may include different elements, components, and/or materials. In some examples, one layer or level may be composed of two or more sublayers or sublevels.

The terms "if," "when," "based on," or "based at least in part on" may be used interchangeably. In some examples, if the terms "if," "when." "based on." or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
identifying, for a memory system comprising a plurality of regions of logical addresses and a plurality of memory cells arranged according to a plurality of physical addresses, a region of the plurality of regions having one or more continuous logical addresses associated with discontinuous corresponding physical addresses of the plurality of physical addresses;
receiving, at a first register of the memory system, a first value enabling rearranging of information associated with continuous logical addresses that are associated with discontinuous corresponding physical addresses; and
rearranging, during a duration for performing one or more maintenance operations on the memory system, information stored within the discontinuous corresponding physical addresses to be within continuous physical addresses of the plurality of physical addresses based at least in part on the first value of the first register, wherein rearranging the information stored within the discontinuous corresponding physical addresses to be within continuous physical addresses of the plurality of physical addresses comprises:
reading data from the discontinuous corresponding physical addresses; and
writing the data associated with the plurality of physical addresses to the continuous physical addresses of the plurality of physical addresses based at least in part on reading the data, wherein rearranging the information is based at least in part on reading the data and writing the data.

2. The method of claim 1, further comprising:
receiving, at a second register of the memory system, a second value; and
determining that a quantity of access operations performed on the plurality of memory cells of the memory system does not satisfy the second value, wherein rearranging the information is based at least in part on determining that the quantity of access operations does not satisfy the second value.

3. The method of claim 2, further comprising:
identifying, after rearranging the information, a second region of the plurality of regions having one or more logical addresses associated with discontinuous corresponding physical addresses of the plurality of physical addresses; and
determining that the quantity of access operations performed on the plurality of memory cells of the memory system satisfies the second value, wherein second information stored within the discontinuous corresponding physical addresses to be within continuous physical addresses of the plurality of physical addresses is not rearranged based at least in part on determining that the quantity of access operations satisfies the second value.

4. The method of claim 1, further comprising:
writing a third value to a third register of the memory system based at least in part on reading the first value from the first register of the memory system, wherein a quantity of the information rearranged is based at least in part on the third value read from the third register of the memory system.

5. The method of claim 1, further comprising:
receiving, from a host device, a first command for performing the one or more maintenance operations on the memory system; and
performing, during the duration, the one or more maintenance operations on the memory system based at least in part on receiving the first command.

6. The method of claim 1, further comprising:
writing a second value to the first register based at least in part on receiving the second value from a host device; and
refraining, during a second duration for performing one or more maintenance operations on the memory system, from defragmenting third information stored within discontinuous corresponding physical addresses from being within continuous physical addresses of the plurality of physical addresses based at least in part on the second value of the first register.

7. An apparatus, comprising:
a memory system comprising a plurality of regions of logical addresses and a plurality of memory cells arranged according to a plurality of physical addresses;
a first register associated with the memory system; and
processing circuitry associated with the memory system, wherein the processing circuitry is configured to cause the apparatus to:
identify a region of the plurality of regions having one or more continuous logical addresses associated with discontinuous corresponding physical addresses of the plurality of physical addresses;
receive, at the first register of the memory system, a first value enabling rearranging of information associated with continuous logical addresses that are associated with discontinuous corresponding physical addresses; and
rearrange, during a duration for performing one or more maintenance operations on the memory system, information stored within the discontinuous corresponding physical addresses to be within continuous physical addresses of the plurality of physical addresses based at least in part on the first value of the first register, wherein, to rearrange the information stored within the discontinuous corresponding physical addresses to be within continuous physical addresses of the plurality of physical addresses, the processing circuitry is configured to cause the apparatus to:
read data from the discontinuous corresponding physical addresses; and
write the data associated with the plurality of physical addresses to the continuous physical addresses of the plurality of physical addresses based at least in part on reading the data, wherein rearranging the information is based at least in part on reading the data and writing the data.

8. The apparatus of claim 7, further comprising:
a second register associated with the memory system, wherein the processing circuitry is further configured to cause the apparatus to:
receive, at the second register, a second value; and
determine that a quantity of access operations performed on the plurality of memory cells of the memory system does not satisfy the second value, wherein rearranging the information is based at least in part on determining that the quantity of access operations does not satisfy the second value.

9. The apparatus of claim 8, wherein the processing circuitry is further configured to cause the apparatus to:
  identify, after rearranging the information, a second region of the plurality of regions having one or more logical addresses associated with discontinuous corresponding physical addresses of the plurality of physical addresses; and
  determine that the quantity of access operations performed on the plurality of memory cells of the memory system satisfies the second value, wherein second information stored within the discontinuous corresponding physical addresses to be within continuous physical addresses of the plurality of physical addresses is not rearranged based at least in part on determining that the quantity of access operations satisfies the second value.

10. The apparatus of claim 7, further comprising:
  a third register associated with the memory system, wherein the processing circuitry is further configured to cause the apparatus to:
    write a third value to the third register based at least in part on reading the first value from the first register of the memory system, wherein a quantity of the information rearranged is based at least in part on the third value read from the third register of the memory system.

11. The apparatus of claim 7, wherein the processing circuitry is further configured to cause the apparatus to:
  receive, from a host device, a first command for performing the one or more maintenance operations on the memory system; and
  perform, during the duration, the one or more maintenance operations on the memory system based at least in part on receiving the first command.

12. The apparatus of claim 7, wherein the processing circuitry is further configured to cause the apparatus to:
  write a second value to the first register based at least in part on receiving the second value from a host device; and
  refrain, during a second duration for performing one or more maintenance operations on the memory system, from defragmenting third information stored within discontinuous corresponding physical addresses from being within continuous physical addresses of the plurality of physical addresses based at least in part on the second value of the first register.

13. The apparatus of claim 7, wherein the processing circuitry is further configured to cause the apparatus to:
  store a first physical address of the plurality of physical addresses in a logical-to-physical table of the memory system based at least in part on rearranging the information.

14. The apparatus of claim 7, wherein the plurality of memory cells are not accessed during the duration.

15. A non-transitory computer-readable medium storing code comprising instructions which, when executed by one or more processors of an electronic device, cause the electronic device to:
  identify, for a memory system comprising a plurality of regions of logical addresses and a plurality of memory cells arranged according to a plurality of physical addresses, a region of the plurality of regions having one or more continuous logical addresses associated with discontinuous corresponding physical addresses of the plurality of physical addresses;
  receive, at a first register of the memory system, a first value enabling rearranging of information associated with continuous logical addresses that are associated with discontinuous corresponding physical addresses; and
  rearrange, during a duration for performing one or more maintenance operations on the memory system, information stored within the discontinuous corresponding physical addresses to be within continuous physical addresses of the plurality of physical addresses based at least in part on the first value of the first register, wherein, to rearrange the information stored within the discontinuous corresponding physical addresses to be within continuous physical addresses of the plurality of physical addresses, the instructions, when executed by the one or more processors of the electronic device, cause the electronic device to:
    read data from the discontinuous corresponding physical addresses; and
    write the data associated with the plurality of physical addresses to the continuous physical addresses of the plurality of physical addresses based at least in part on reading the data, wherein rearranging the information is based at least in part on reading the data and writing the data.

16. The non-transitory computer-readable medium of claim 15, wherein the instructions, when executed by the one or more processors of the electronic device, further cause the electronic device to:
  receive, at a second register of the memory system, a second value; and
  determine that a quantity of access operations performed on the plurality of memory cells of the memory system does not satisfy the second value, wherein rearranging the information is based at least in part on determining that the quantity of access operations does not satisfy the second value.

17. The non-transitory computer-readable medium of claim 16, wherein the instructions, when executed by the one or more processors of the electronic device, further cause the electronic device to:
  identify, after rearranging the information, a second region of the plurality of regions having one or more logical addresses associated with discontinuous corresponding physical addresses of the plurality of physical addresses; and
  determine that the quantity of access operations performed on the plurality of memory cells of the memory system satisfies the second value, wherein second information stored within the discontinuous corresponding physical addresses to be within continuous physical addresses of the plurality of physical addresses is not rearranged based at least in part on determining that the quantity of access operations satisfies the second value.

18. The non-transitory computer-readable medium of claim 15, wherein the instructions, when executed by the one or more processors of the electronic device, further cause the electronic device to:
  write a third value to a third register of the memory system based at least in part on reading the first value from the first register of the memory system, wherein a quantity of the information rearranged is based at least in part on the third value read from the third register of the memory system.

19. The non-transitory computer-readable medium of claim 15, wherein the instructions, when executed by the one or more processors of the electronic device, further cause the electronic device to:

receive, from a host device, a first command for performing the one or more maintenance operations on the memory system; and perform, during the duration, the one or more maintenance operations on the memory system based at least in part on receiving the first command.

20. The non-transitory computer-readable medium of claim 15, wherein the instructions, when executed by the one or more processors of the electronic device, further cause the electronic device to:

write a second value to the first register based at least in part on receiving the second value from a host device; and refrain, during a second duration for performing one or more maintenance operations on the memory system, from defragmenting third information stored within discontinuous corresponding physical addresses from being within continuous physical addresses of the plurality of physical addresses based at least in part on the second value of the first register.

21. The non-transitory computer-readable medium of claim 1, wherein the instructions, when executed by the one or more processors of the electronic device, further cause the electronic device to:

store a first physical address of the plurality of physical addresses in a logical-to-physical table of the memory system based at least in part on rearranging the information.

22. The non-transitory computer-readable medium of claim 15, wherein the plurality of memory cells are not accessed during the duration.

* * * * *